(12) United States Patent
Heco et al.

(10) Patent No.: US 9,046,542 B2
(45) Date of Patent: Jun. 2, 2015

(54) BEARING ASSEMBLY FOR AN ANEMOMETER

(71) Applicant: NRG Systems, Inc., Hinesburg, VT (US)

(72) Inventors: Emir Heco, Essex Junction, VT (US); Travis Jones, Fairfax, VT (US); Carolyn Turk West, Essex Function, VT (US); Henry Bush, Richmond, VT (US); R. Paul Smith, Burlington, VT (US); Timothy R. Hoopes, Hinesburg, VT (US)

(73) Assignee: NRG SYSTEMS, INC., Hinesburg, VT (US)

( * ) Notice: Subject to any disclaimer, the term of this patent is extended or adjusted under 35 U.S.C. 154(b) by 57 days.

(21) Appl. No.: 13/862,389

(22) Filed: Apr. 13, 2013

(65) Prior Publication Data

US 2014/0137665 A1 May 22, 2014

Related U.S. Application Data

(60) Provisional application No. 61/623,999, filed on Apr. 13, 2012.

(51) Int. Cl.
*G01P 5/06* (2006.01)
*G01P 3/44* (2006.01)

(52) U.S. Cl.
CPC .. *G01P 3/443* (2013.01); *G01P 5/06* (2013.01)

(58) Field of Classification Search
USPC .............................. 73/861.77, 861.85, 861.83
See application file for complete search history.

(56) References Cited

U.S. PATENT DOCUMENTS

| | | | | |
|---|---|---|---|---|
| 3,788,142 A | * | 1/1974 | Goransson | 73/861.83 |
| 3,823,611 A | * | 7/1974 | Rudow et al. | 73/861.85 |
| 4,177,673 A | * | 12/1979 | Krueger | 73/861.85 |
| 8,166,830 B2 | * | 5/2012 | Vo | 73/861.77 |

* cited by examiner

*Primary Examiner* — Jewel V Thompson
(74) *Attorney, Agent, or Firm* — Grossman, Tucker, Perreault & Pfleger, PLLC

(57) ABSTRACT

A bearing assembly for an anemometer configured to provide thrust and axial load protection and reduce exposure to potentially degradative debris and/or contaminants. The bearing assembly includes a first shaft and a second shaft and bearings, wherein the bearings are configured to rotate about at least the first shaft while enclosed within a portion of the second shaft. The second shaft is configured to isolate the bearings from any air flow through the anemometer and debris and/or contaminants carried therewith. The bearing assembly further includes a damping member configured to reduce forces imparted upon the bearings, thereby providing protection and preventing premature damage to the bearings from loads.

20 Claims, 3 Drawing Sheets

BEARING ASSEMBLY FOR AN ANEMOMETER

CROSS-REFERENCE TO RELATED APPLICATIONS

The present application claims the benefit of U.S. Provisional Patent Application Ser. No. 61/623,999, filed Apr. 13, 2012, the entire disclosure of which is incorporated herein by reference.

FIELD

The present disclosure relates generally to wind speed measuring devices, and, more particularly, to an anemometer having an improved bearing assembly.

BACKGROUND

An anemometer is generally understood to be a device for measuring wind speed. An anemometer may include a rotor with radially extending blades and/or cups for catching wind or other fluid flow which, in turn, may cause the rotor to spin about an axis. Wind speed or fluid flow rate may be directly proportional to the revolutions of the rotor in a given period of time, and a pickup device, such as a transducer, coupled to the rotor may convert the rotational speed of the rotor into a corresponding electrical output signal proportional to wind speed or fluid flow rate.

An anemometer may further include a bearing assembly for allowing the rotor to freely spin about an axis. However, bearing assemblies may be susceptible to degradation from impact loads and/or contamination from debris and other particulate matter. For example, in the field, anemometers, including the bearing assemblies, may be exposed to various forms of debris and contaminants carried by the wind and may further be subject to impact loads due to structure ice shedding and/or weather precipitation, such as rain, snow, hail, sleet, etc.

Current anemometers may be arranged in such a way that air exchange occurring through the anemometer may also occur through the bearing assembly, thereby exposing the bearing assembly to debris and contaminants. For example, some current anemometers include a single shaft about which the rotor may rotate. However, the bearing assembly for allowing the single shaft to rotate may be exposed to incoming debris carried with the air.

Some anemometers may include mechanical seals in an attempt to prevent exposure of the bearing assembly to contaminants and weather-related events. In particular, some anemometers may include a labyrinth seal within the bearing assembly to reduce airflow and further trap particulates in the labyrinth seal, rather than relying on the bearing assembly, for example.

A bearing assembly having a labyrinth seal may have drawbacks. For example, a bearing assembly including a labyrinth seal may still allow air and small debris, such as corrosive pollutants and abrasive dust, to pass through the assembly. In particular, a basic flaw in a labyrinth seal design is that air exchange still occurs inside the sensor and must pass through the bearings due in part to the single-shaft design of the anemometer. In order to compensate for any water that may pass into the air exchange, anemometers having a labyrinth seal may further include drain holes for allowing water to pass through the labyrinth seal and drain. The drain holes may improve airflow through the anemometer, thereby further exposing the bearings to debris. Additionally, in order for a labyrinth seal to properly function as intended, it may be required that the dimensional clearances and/or manufacturing tolerances of the bearing assembly be relatively tight and restrictive.

Some anemometers may also include bearing assemblies wherein the rolling elements, such as ball bearings, may be sealed. As generally understood, sealed bearings may be formed by creating a seal contacting and engaging both inner and outer races of the bearing, thereby sealing the rolling elements. However, although sealed bearings may function to prevent debris from entering the bearing, the structure of a sealed bearing may result in higher amounts of friction, thereby causing relatively inaccurate and poor interpretation of the wind direction and/or speed by the anemometer.

BRIEF DESCRIPTION OF THE DRAWINGS

Features and advantages of the present disclosure are set forth by the description of embodiments consistent therewith, which description should be considered in conjunction with the accompanying drawings, wherein.

DETAILED DESCRIPTION

The present disclosure is generally directed to a bearing assembly for an anemometer. The bearing assembly includes a first shaft and a second shaft and bearings, wherein the bearings are configured to rotate about at least the second shaft while enclosed within a portion of the first shaft. The first shaft is configured to isolate the bearings from airflow through the anemometer and debris and/or contaminants carried with the airflow. The bearing assembly further includes a damping member configured to reduce forces imparted upon the roller bearings, thereby providing protection and preventing premature damage to the roller bearings from thrust and/or axial loads.

Accordingly, a bearing assembly consistent with the present disclosure is configured to support thrust and/or axial loads upon an anemometer reduce exposure of internal components of the bearing assembly to potentially harmful and/or degradative debris and/or contaminants from the exterior environment.

Figure 1:
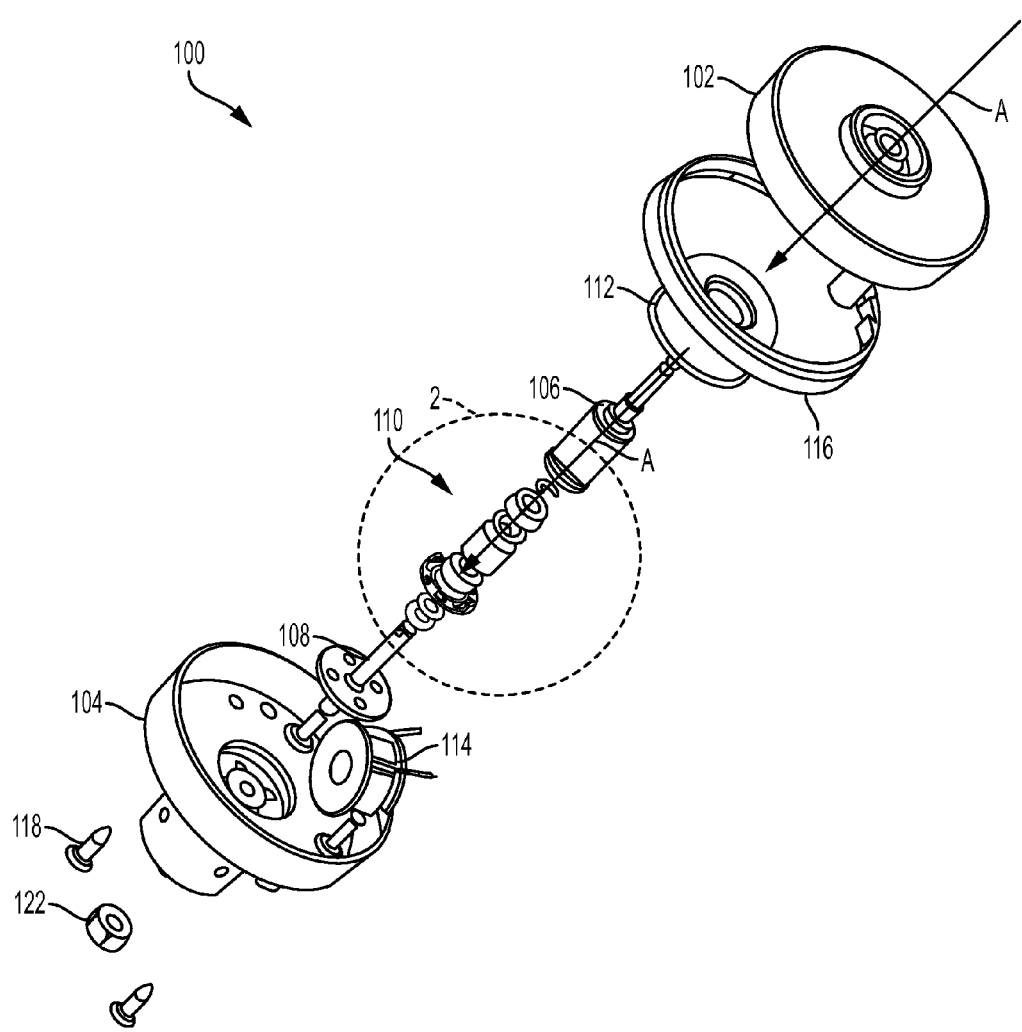
FIG. 1 is a perspective exploded view of a portion of an anemometer consistent with the present disclosure.

Turning to FIG. 1, a perspective exploded view of a portion of an anemometer consistent with the present disclosure is generally illustrated. Generally, the anemometer 100 may include a first housing member 102 and a second housing member 104 configured to be coupled to one another. The first and second housing members 102, 104 may be configured to receive and retain a first shaft 106, a second shaft 108 and a bearing assembly 110 within. The anemometer 100 may further include a magnet 112 and a pickup member 114 configured to determine a wind speed or fluid flow rate of the anemometer 100. As shown, the magnet 112 and/or pick member 114 may be positioned within the first and second housing members 102, 104. The anemometer 100 may further include a calibration ring 116 configured to be positioned within the first and second housing members 102, 104.

The first and second housing members 102, 104 may be coupled to one another by any known means. In the illustrated embodiment, the first and second housing members 102, 104 may be coupled to one another by way of fasteners 118. The second shaft 108 may be coupled to the second housing member 104 by way of a fastener 122, such as, for example, a lock nut, and the second shaft 108 may be in a fixed position.

Figure 2:
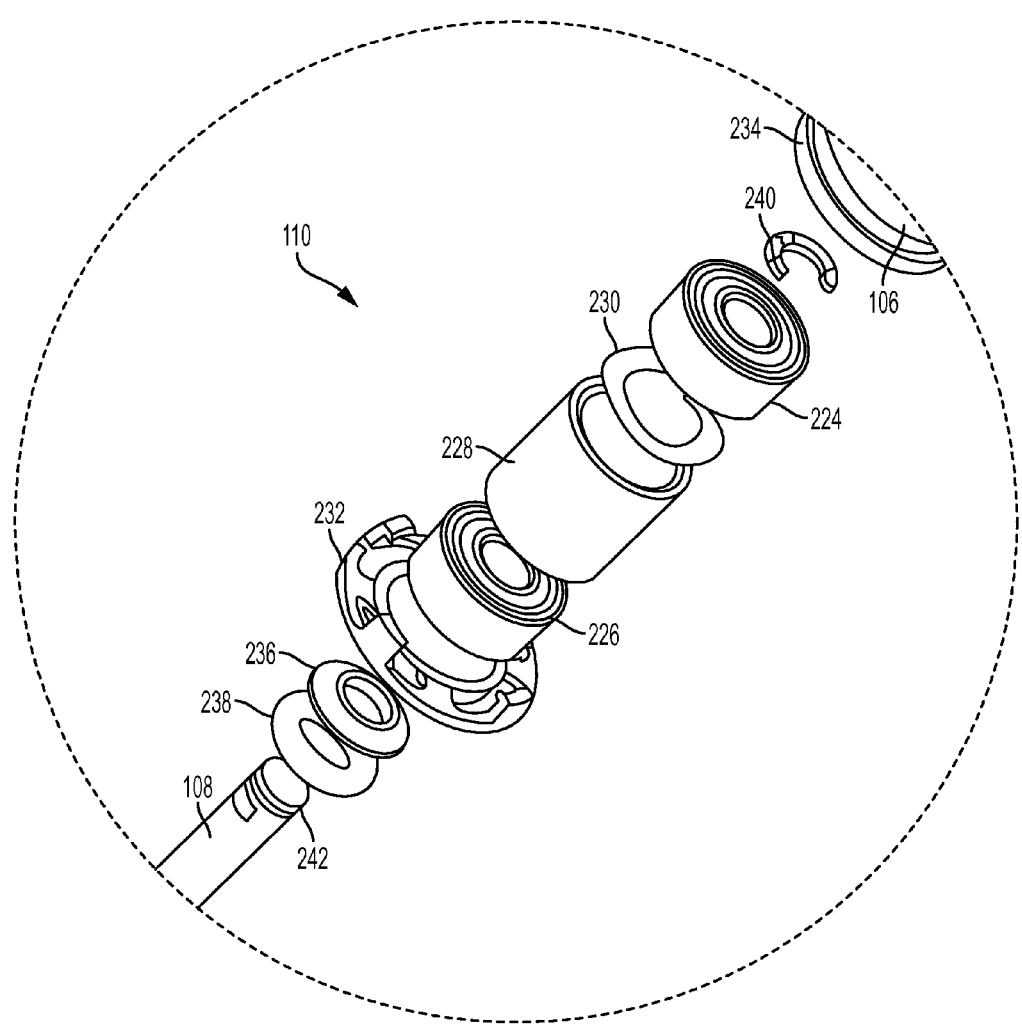
FIG. 2 is an enlarged view of a portion of the anemometer of FIG. 1.

FIG. 2 is an enlarged view of a portion of the anemometer 100 of FIG. 1. As shown, the bearing assembly 110 may include a first bearing 224 and a second bearing 226 spaced apart from one another by a spacing member 228. As shown, the first and second bearings 224, 226 may include roller bearings. However, it should be noted that in other embodiments, the first and second bearings 224, 226 may include any type of known bearing, including, but not limited to, roller bearings, plain bearings, jewel bearings, fluid bearings, magnetic bearings, and flexure bearings, or combinations thereof. The bearing assembly 110 may further include a spring element 230 positioned between the spacing member 228 and the first bearing 224. The bearing assembly 110 may further include a retaining element 232 positioned adjacent to the second bearing 226 and configured to engage a flange portion 234 of the first shaft 106. As shown, the retaining element 232 may include a snap-fit ring, for example. When the retaining element 232 and flange portion 234 of the first shaft 106 are coupled to one another (as shown in FIG. 3), at least the first and second bearings 224, 226, spacing member 228 and spring element 230 are coupled to one another and received within a portion of the first shaft 106.

Figure 3:
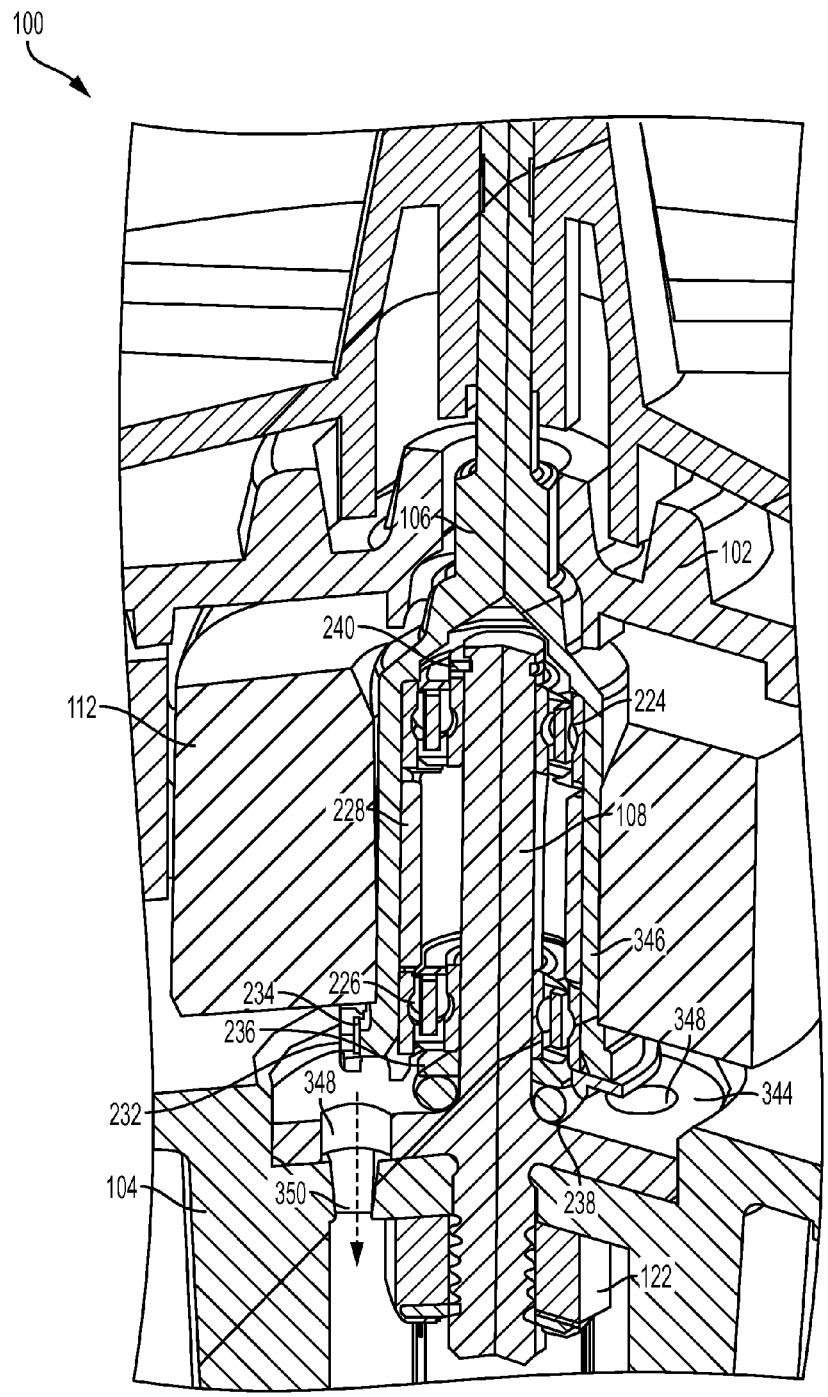
FIG. 3 is a perspective view, partly in section, of a portion of an anemometer illustrating the bearing assembly of the anemometer in an assembled state consistent with the present disclosure.

The bearing assembly 110 may further include a chamfered washer 236 positioned adjacent to the second bearing 226 and configured to support at least a portion (e.g., an inner race) of the second bearing 226 when the bearing assembly 110 is in an assembled state (shown in FIG. 3). The bearing assembly 110 may further include a damping member 238 positioned adjacent to the chamfered washer 236 and configured to support the inner race of the second bearing 226 by way of the chamfered washer 236. The damping member 238 may be configured to reduce peak loads imparted upon the first and second bearings 224, 226, thereby improving longevity of the bearings 224, 226, as described in greater detail herein.

As shown, each of the components of the bearing assembly 110 may be shaped and/or sized to receive a portion of the second shaft 108. In the illustrated embodiment, each component (e.g. first and second bearings 224, 226, spacing member 228, spring element 230, retaining element 232, chamfered washer 236 and damping member 238) may include an aperture defined therein shaped and/or sized to receive and allow a portion of the second shaft 108 to pass therethrough. When in an assembled state, shown in FIG. 3, the components of the bearing assembly 110 may be stacked upon one another and supported by the second shaft 108 and may further be secured to the second shaft 108 by a retaining ring 240 coupled to a receiving portion 242 (e.g. a radial groove) of the second shaft 108.

FIG. 3 is a perspective view, partly in section, of a portion of an anemometer 100 illustrating the bearing assembly 110 in an assembled state consistent with the present disclosure. As shown, the bearing assembly 110 may be supported by a flange portion 344 of the second shaft 108. More specifically, the damping member 238 may engage the flange portion 344 and may further support the remaining components of the bearing assembly 110. As shown, the bearing assembly 110 may be supported by and coupled to the second shaft 108, wherein portions (e.g. inner races) of the first and second bearings 224, 226 may be securely coupled to the second shaft 106 (i.e. pressure fit). The second shaft 108 is coupled to the second housing member 104 by the lock nut fastener 122, and the second shaft 108 may be in a fixed position.

As shown, the first shaft 106 may include a portion configured to receive and enclose a portion of the bearing assembly 110. More specifically, the first shaft 106 may include a cavity 346, wherein the cavity 346 may be shaped and/or sized to receive and enclose at least the first and second bearings 224, 226, the spacing member 228, the spring element 230 and a portion of the second shaft 106 upon which such components are coupled to. The cavity 346 may terminate at flange portion 234, wherein the retaining element 232 positioned adjacent the second bearing 226 may engage the flange portion 234 of the first shaft 106, thereby retaining components of the bearing assembly 110 within the cavity 346 of the first shaft 106. When in an assembled state, the first shaft 106 may be configured to rotate about the second shaft 108.

As shown, the first shaft 106, particularly the cavity 346 of the first shaft 106, may be configured to encapsulate at least the first and second bearings 224, 226 and to provide a generally tight seal with at least portions (e.g. outer races) of the bearings 224, 226, thereby placing the bearings 224, 226 in a generally closed environment. The closed environment may reduce or eliminate exposure of the first and second bearings 224, 226 to debris and/or contaminants, etc., of the exterior environment, such as, for example, moisture and/or dust and debris within the air.

In the illustrated embodiment, the flange 344 of the second shaft 108 may further include one or more apertures 348 defined therein. The apertures 348 may be configured to allow air (and any contaminants carried with the air) to flow through the anemometer 100 without passing through the cavity 346 of the first shaft 106. As shown, air may enter through the first housing member 102 through an opening between the first housing member 102 and the first shaft 106. The bearings 224, 226 may be encapsulated by the first shaft 106 and thereby protected from contaminants, such as debris, carried by the air. The airflow, and any contaminants within, may flow past the first shaft 106 and any may further flow through the apertures 348 defined in the flange 344 of the second shaft 108. As shown, the second housing member 104 may include one or more apertures 350 defined therein and aligned with the apertures 348 of the flange 344 of the second shaft 108, such that the apertures 348, 350 are configured to fluidly communicate with one another. Accordingly, airflow, including contaminants, such as water or debris within, are allowed to pass through the apertures 348 of the second shaft 108 and the corresponding apertures 350 of the second housing member 104 and out of the interior of the anemometer 100.

As previously described, the damping member 238 may be configured to reduce peak loads imparted upon the first and second bearings 224, 226. As shown, the damping member 238 is positioned adjacent the chamfering washer 236 and configured to support at least the inner race of the second bearing 226. The damping member 238 further engages a portion of the flange 344 of the second shaft 108. A load imparted upon at least the first shaft 106 during operation of the anemometer 100 may transfer through the outer races of the first and second bearings 224, 226 and to at least the inner race of the second bearing 226 and then transfer to the damping member 238. In turn, the damping member 238 may be configured to reduce peak loads experienced by the first and second bearings 224, 226.

The damping member 238 may include a resilient and durable material capable of elastic expansion when a force is applied thereto and elastic recovery when the force is removed therefrom. More specifically, the damping member 238 may deform upon receiving a load from the inner race of the second bearing 226, thereby reducing the peak load imparted upon the bearings 224, 226. The damping member 238 may return (i.e. recover) to the original state upon removal of the load therefrom. The material may include, but is not limited to, either natural or synthetic materials such as polymers and/or co-polymers. Examples include polyurethane, latex, natural rubber, nylon (polyamides), polyester, polyethylene, polypropylene, PVC, fluoroplastics, block copolymers, polyethers and composites thereof. In the illustrated embodiment, the damping member 238 may include an o-ring, for example.

According to one aspect of the disclosure, there is provided a anemometer. The anemometer includes a bearing assembly and a first shaft having a first end defining a cavity within, wherein a portion of the bearing assembly is positioned within and enclosed by the cavity. The anemometer further includes a second shaft having a first end coupled to a portion of the bearing assembly and positioned within the cavity of the first end of the first shaft. The second shaft further includes a flange portion configured to support the bearing assembly and the first shaft thereon, wherein the first shaft is configured to rotate about the second shaft.

According to another aspect of the present disclosure, there is provided a anemometer. The anemometer includes a bearing assembly. The bearing assembly includes a first bearing having an inner race and an outer race and a second bearing having an inner race and an outer race. The second bearing is spaced a distance apart from the first bearing by way of a spacing member. The anemometer further includes a first shaft having a first end defining a cavity within, wherein the first and second bearings and the spacing member are positioned within and enclosed by the cavity. The outer races of the first and second bearings are coupled to an interior surface of the cavity of the first shaft. The anemometer further includes a second shaft having a first end coupled to the inner races of the first and second bearings and is positioned within the cavity of the first shaft. The second shaft further includes a flange portion configured to support the bearing assembly and the first shaft thereon.

The anemometer further includes a first housing member and a second housing member coupled to one another and forming a cavity therebetween. The bearing assembly and portions of the first second shafts are positioned within the cavity, wherein a second end of the second shaft is fixedly coupled to a portion of the second housing member and the first shaft is configured to rotate about the second shaft.

According to yet another aspect of the present disclosure, there is provided a anemometer. The anemometer includes a first housing member and a second housing member coupled to one another and forming a cavity therebetween. The anemometer further includes a first shaft and a second shaft positioned within the cavity of the first and second housing members. The first shaft is positioned adjacent to the first housing member and the second shaft is positioned adjacent to the second housing member and fixedly coupled to a portion thereof. The first shaft is configured to rotate about the second shaft by way of a bearing assembly.

The bearing assembly includes a first bearing and a second bearing positioned within a cavity defined on a first end of the first shaft. The first and second bearings have inner races coupled to a portion of a first end of the second shaft positioned within the cavity of the first shaft and outer races coupled to an interior surface of the cavity of the first shaft. The bearing assembly further includes a damping member positioned between the second bearing and a flange portion of the second shaft. The damping member is configured to reduce peak loads imparted upon at least one of the first and second bearings.

The anemometer further includes a magnet and a pickup member positioned within the cavity of the first and second housing members and adjacent to a portion of the first and second shafts. The magnet and the pickup member are configured to cooperate with one another to detect rotation of at least the first shaft relative to the second shaft.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A anemometer comprising:
   a bearing assembly;
   a first shaft having a first end defining a cavity within, wherein a portion of said bearing assembly is positioned within and enclosed by said cavity; and
   a second shaft having a first end coupled to a portion of said bearing assembly and positioned within said cavity of said first end of said first shaft and a flange portion configured to support said bearing assembly and said first shaft thereon, wherein said first shaft is configured to rotate about said second shaft.

2. The anemometer of claim 1, wherein said bearing assembly comprises a first bearing and a second bearing positioned within said cavity of said first shaft, said first and second bearings having inner races coupled to a portion of said first end of said second shaft and outer races coupled to an interior surface of said cavity of said first shaft.

3. The anemometer of claim 2, wherein said cavity of said first shaft encapsulates said first and second bearings and provides a generally closed environment.

4. The anemometer of claim 2, wherein said bearing assembly further comprises a retaining element positioned adjacent to a flange portion defined at a periphery of said cavity of said first shaft, said retaining element configured to engage said flange portion and retain said first and second bearings within said cavity of said first shaft.

5. The anemometer of claim 2, wherein said bearing assembly further comprises a damping member positioned between said second bearing and said flange portion of said second shaft, said damping member configured to reduce peak loads imparted upon at least one of the first and second bearings.

6. The anemometer of claim 5, wherein said damping member comprises a resilient and durable material capable of elastic expansion when a force is applied thereto and elastic recovery when the force is removed therefrom.

7. The anemometer of claim 6, wherein said damping member material is selected from the group consisting of polyurethane, latex, natural rubber, nylon (polyamides), polyester, polyethylene, polypropylene, PVC, fluoroplastics, block copolymers, polyethers and composites thereof.

8. The anemometer of claim 5, wherein said bearing assembly further comprises a chamfered washer positioned between said second bearing and said damping member, said chamfered washer being configured to support at least said inner race of said second bearing.

9. The anemometer of claim 1, wherein said flange portion of said second shaft has one or more apertures defined therein, said one or more apertures being configured to allow air to flow within said anemometer and bypass said cavity of said first shaft and said first and second bearings positioned within.

10. The anemometer of claim 1, further comprising a first housing member and a second housing member coupled to one another and forming a cavity therebetween, wherein said bearing assembly and portions of said first second shafts are positioned within said cavity.

11. The anemometer of claim 10, wherein said second housing member has one or more apertures defined therein and configured to fluidly communicate with one or more apertures defined in said flange portion of said second shaft and allow air to flow from within said cavity of said first and second housing members to an exterior of said first and second housing member.

12. A anemometer comprising:
a bearing assembly comprising:
a first bearing having an inner race and an outer race; and
a second bearing having an inner race and an outer race, said second bearing being spaced a distance apart from said first bearing by way of a spacing member;
a first shaft having a first end defining a cavity within, wherein said first and second bearings and said spacing member are positioned within and enclosed by said cavity, said outer races of said first and second bearings being coupled to an interior surface of said cavity of said first shaft;
a second shaft having a first end coupled to said inner races of said first and second bearings and positioned within said cavity of said first shaft and a flange portion configured to support said bearing assembly and said first shaft thereon; and a first housing member and a second housing member coupled to one another and forming a cavity therebetween, wherein said bearing assembly and portions of said first second shafts are positioned within said cavity, wherein a second end of said second shaft is fixedly coupled to a portion of said second housing member and said first shaft is configured to rotate about said second shaft.

13. The anemometer of claim 12, further comprising a magnet and a pickup member positioned within said cavity of said first and second housing members and adjacent to a portion of said first and second shafts, said magnet and said pickup member being configured to cooperate with one another to detect rotation of at least said first shaft relative to said second shaft.

14. The anemometer of claim 12, wherein said cavity of said first shaft encapsulates said first and second bearings and provides a generally closed environment.

15. The anemometer of claim 12, wherein said bearing assembly further comprises:
a retaining element positioned adjacent to a flange portion defined at a periphery of said cavity of said first shaft, said retaining element configured to engage said flange portion and retain said first and second bearings within said cavity of said first shaft; and
a damping member positioned between said second bearing and said flange portion of said second shaft, said damping member configured to reduce peak loads imparted upon at least one of the first and second bearings.

16. The anemometer of claim 15, wherein said damping member comprises a resilient and durable material capable of elastic expansion when a force is applied thereto and elastic recovery when the force is removed therefrom.

17. The anemometer of claim 12, wherein said flange portion of said second shaft has one or more apertures defined therein and configured to allow air to flow within said cavity of said first and second housing members and bypass said cavity of said first shaft and said first and second bearings positioned within.

18. The anemometer of claim 17, wherein said second housing member has one or more apertures defined therein and configured to fluidly communicate with said one or more apertures defined in said flange portion of said second shaft and allow air to flow from within said cavity of said first and second housing members to an exterior of said first and second housing member.

19. A anemometer comprising:
a first housing member and a second housing member coupled to one another and forming a cavity therebetween;
a first shaft and a second shaft positioned within said cavity of said first and second housing members, said first shaft being positioned adjacent to said first housing member and said second shaft being positioned adjacent to said second housing member and fixedly coupled to a portion thereof, said first shaft being configured to rotate about said second shaft by way of a bearing assembly, said bearing assembly comprising:
a first bearing and a second bearing positioned within a cavity defined on a first end of said first shaft, said first and second bearings having inner races coupled to a portion of a first end of said second shaft positioned within said cavity of said first shaft and outer races coupled to an interior surface of said cavity of said first shaft; and a damping member positioned between said second bearing and a flange portion of said second shaft, said damping member configured to reduce peak loads imparted upon at least one of the first and second bearings; and a magnet and a pickup member positioned within said cavity of said first and second housing members and adjacent to a portion of said first and second shafts, said magnet and said pickup member being configured to cooperate with one another to detect rotation of at least said first shaft relative to said second shaft.

20. The anemometer of claim 19, wherein said second housing member has one or more apertures defined therein, said one or more apertures being configured to fluidly communicate with one or more apertures defined in said flange portion of said second shaft and allow air to flow from within said cavity of said first and second housing members to an exterior of said first and second housing member and bypass said cavity of said first shaft and said first and second bearings positioned within.

* * * * *